(12) United States Patent
Bauer (10) Patent No.: US 7,042,846 B2
(45) Date of Patent: May 9, 2006

(54) RESTRICTIVE COSTS IN NETWORK SYSTEMS

(75) Inventor: Daniel Bauer, Birmensdorf (CH)

(73) Assignee: International Business Machines Corporation, Armonk, NY (US)

( * ) Notice: Subject to any disclaimer, the term of this patent is extended or adjusted under 35 U.S.C. 154(b) by 1057 days.

(21) Appl. No.: 09/771,091

(22) Filed: Jan. 27, 2001

(65) Prior Publication Data

US 2001/0017845 A1 Aug. 30, 2001

(30) Foreign Application Priority Data

Jan. 27, 2000 (EP) ............................................. 00810075

(51) Int. Cl.
*H04L 12/28* (2006.01)
*G06F 15/173* (2006.01)

(52) U.S. Cl. ............. 370/238; 370/395.31; 370/395.52; 370/400; 370/408; 455/445; 709/241

(58) Field of Classification Search ................. 370/218, 370/238–238.1, 256–299, 351–357, 360, 370/367, 382, 389, 392, 397, 395.31, 395.52, 370/400, 408; 709/238–242; 455/455; 379/272–273
See application file for complete search history.

(56) References Cited

U.S. PATENT DOCUMENTS

| | | | | |
|---|---|---|---|---|
| 6,256,309 B1 * | 7/2001 | Daley et al. | ............ | 370/395.43 |
| 6,370,119 B1 * | 4/2002 | Basso et al. | ................. | 370/252 |
| 6,560,654 B1 * | 5/2003 | Fedyk et al. | ................. | 709/239 |
| 6,600,724 B1 * | 7/2003 | Cheng | .......................... | 370/256 |
| 6,621,798 B1 * | 9/2003 | Krishnan et al. | ............ | 370/256 |
| 6,628,670 B1 * | 9/2003 | Galand et al. | ............... | 370/468 |
| 6,633,544 B1 * | 10/2003 | Rexford et al. | .............. | 370/238 |
| 6,687,229 B1 * | 2/2004 | Kataria et al. | ............... | 370/238 |
| 6,690,671 B1 * | 2/2004 | Anbiah et al. | .......... | 370/395.43 |
| 6,697,333 B1 * | 2/2004 | Bawa et al. | ................. | 370/238 |
| 6,717,920 B1 * | 4/2004 | Cheng | .......................... | 370/255 |
| 2001/0015958 A1 * | 8/2001 | Iliadis | .......................... | 370/238 |
| 2002/0015386 A1 * | 2/2002 | Kajiwara | ..................... | 370/351 |

* cited by examiner

*Primary Examiner*—Douglas Olms
*Assistant Examiner*—Van Kim T. Nguyen
(74) *Attorney, Agent, or Firm*—Ference & Associates (57) ABSTRACT

Methods and apparatus are provided for generating a set of restrictive costs associated with directional paths between selected nodes in a group of nodes of a network system wherein each node in the group is connected by a link to at least one other node in the group, and each link has a pair of directional costs associated therewith such that each link can be considered as a pair of oppositely-directed, unidirectional links each of which extends from a source node to a destination node and has a said directional cost associated therewith. The method allows asymmetric costs, rather than merely symmetric costs, to be considered, and can be applied, for example, to generate the transition matrix for a PNNI peer group.

23 Claims, 9 Drawing Sheets

| Edge | Cost | Src Vertex | Dst Vertex |
|------|------|------------|------------|
| 1 | 5 | 1 | 3 |
| 2 | 5 | 8 | 6 |
| 3 | 10 | 8 | 7 |
| 4 | 10 | 6 | 9 |
| 5 | 15 | 3 | 6 |
| 6 | 15 | 7 | 3 |
| 7 | 20 | 5 | 6 |
| 8 | 20 | 4 | 1 |
| 9 | 25 | 3 | 2 |
| 10 | 25 | 6 | 7 |
| 11 | 30 | 9 | 8 |
| 12 | 30 | 2 | 10 |
| 13 | 35 | 4 | 3 |
| 14 | 35 | 5 | 4 |
| 15 | 40 | 10 | 7 |
| 16 | 40 | 2 | 1 |
| 17 | 45 | 1 | 2 |
| 18 | 45 | 7 | 10 |
| 19 | 50 | 3 | 4 |
| 20 | 50 | 4 | 5 |
| 21 | 55 | 10 | 2 |
| 22 | 55 | 8 | 9 |
| 23 | 60 | 2 | 3 |
| 24 | 60 | 7 | 6 |
| 25 | 65 | 6 | 5 |
| 26 | 65 | 1 | 4 |
| 27 | 70 | 3 | 7 |
| 28 | 70 | 6 | 3 |
| 29 | 75 | 7 | 8 |
| 30 | 75 | 9 | 6 |
| 31 | 80 | 6 | 8 |
| 32 | 80 | 3 | 1 |

RESTRICTIVE COSTS IN NETWORK SYSTEMS

CLAIM FOR PRIORITY

The application claims priority from EP Application No. 00810075.2, filed on Jan. 27, 2000, which is hereby incorporated by reference as if fully set forth herein.

FIELD OF THE INVENTION

This invention relates generally to restrictive costs in network systems. Particular embodiments of the invention provide methods and apparatus for generating restrictive costs for directional paths between nodes in a network system.

BACKGROUND OF THE INVENTION

In general in data communications networks, network devices such as switches, routers, bridges, brouters, etc. constitute nodes of the network and are interconnected by links for communication of data between the nodes. Data communications, or "calls", between a sending node and a receiving node are routed over paths in the network structure which may involve multiple nodes and links. Information about the network topology is required to determine call paths, and the nature of this topology information, and how it is used, are important factors in the overall efficiency of the system. Network systems, which may comprise a single network or an internetwork, commonly employ some form of hierarchical or multi-layer model whereby nodes at the network layer are grouped in some way, and detailed information about the topology within the group is not available to nodes outside the group. As a simple example, in the case of an internetwork with multiple interconnected networks, detailed information about the topology within a given one of the networks may not be available to the other networks. Thus each individual network can be considered as a group of nodes for which detailed topology information is not available outside the group. A more complex example is provided by PNNI (Private Network-to-Network Interface) networks. The PNNI protocol will be discussed in detail below. Briefly, however, a multi-layer model is employed whereby nodes at the network layer are grouped to form "peer groups". One node in each peer group is designated "peer group leader" and serves to represent the peer group as a single logical node (a "logical group node" or LGN) in the next layer up of the hierarchy. The nodes in this next layer are similarly grouped into peer groups each of which is represented as a single node in the next layer, and so on. The detailed topology of each peer group is known only to nodes within that peer group. Nodes outside that peer group see the peer group abstracted as a logical group node. A PNNI peer group thus provides another example of a group of nodes (which may themselves be logical group nodes in this case) for which detailed topology information about the group is not available outside the group.

The topology data required for path selection and routing in a network system may include not only details of the layout of nodes and links but also certain "quality of service" parameters. For example, a call to be routed over a network may require a certain bandwidth. In this case, knowledge of the bandwidth of links in the network is required to determine if the call can be connected successfully. To allow such parameters to be taken into account, "costs" can be associated with links and paths in a network. The cost of a link is expressed as an arbitrary value determined as some function of the parameter, eg., bandwidth, about which knowledge is required. Whatever the particular function employed, according to convention it is usual for the cost to be defined such that the lower the cost the better the link. In the case of bandwidth, for example, the cost C of a link may be defined as C=1/bandwidth. A path in a network, involving multiple links, can be measured by a "restrictive cost." According to the definition of restrictive cost, the weakest link in a path defines the restrictive cost of the path. Thus, when convention is followed such that a higher cost corresponds to a weaker link, the restrictive cost of a path will be determined by the maximum of the costs of the constituent links.

The concept of restrictive cost is useful wherever it is necessary to determine whether a call can traverse a given routing domain for a specified cost. While individual links in a network may have associated costs, the examples of hierarchical systems described above demonstrate that the details of these individual links may not be known throughout the whole network system over which calls are routed. In particular, where there is some group of nodes for which detailed topology information is not available outside the group, it may be necessary to determine whether a call can traverse that group of nodes for a specified cost. In such cases, the necessary information can be provided by a set of restrictive costs, for example in the form of a cost matrix, defining the restrictive cost of paths traversing the group. More specifically, where the group has a number of "border nodes" which are connected by links to nodes outside the group, a set of restrictive costs for the group can include the restrictive costs of the paths between the border nodes. This information can then be used to determine if a given call can be routed across the group for the required cost. There may of course be more than one path between a given pair of border nodes. In this case it is desirable to give the restrictive cost of the best path, ie. that with the lowest restrictive cost. Moreover, costs associated with links and paths can be directional. That is, there may be a particular cost associated with traversing a given link/path in each direction. In effect, therefore, a given link can be considered as a pair of oppositely-directed, unidirectional links each of which has an associated cost, and the cost can be different for the two directions. Such costs are said to be "asymmetric". To avoid loss of information, it is desirable for such asymmetric costs to be taken into account in deriving the restrictive cost set for a group of nodes, so that the restrictive costs are given for directional paths in both directions between the required nodes. The problem is how to efficiently derive the required set of restrictive costs for a given group of nodes.

The problem is in some ways similar to the class of problems known as "finding all pairs of shortest paths". Algorithms which address this are discussed by T. H. Cormen, C. E. Leiserson and R. L. Rivest in "Introduction to Algorithms", The MIT Press, 1989, particular examples being the Floyd-Warshall algorithm and Johnson's algorithm. These algorithms compute optimal paths between all node pairs represented by vertices in a graph. The complexity of these algorithms is no lower than $O(neLoge)$ (with Johnson's algorithm for sparse graphs), and usually $O(n^3)$ (Floyd-Warshall algorithm), where n is the number of vertices in the graph and e is the number of edges in the graph.

In order to compute a cost matrix using traditional routing algorithms such as those of Dijkstra, Bellman-Ford or Floyd-Warshall as mentioned above, usually $O(n^3)$ steps are needed where n is the number of nodes in the network. As already noted, however, the purpose of these algorithms is to compute a path through a network rather than generate a cost matrix. Our copending European patent application No.

98114966.9, filed Aug. 10, 1998, discloses a method for generating a restrictive cost matrix using a graph coloring technique. This method is also discussed in "Transition Matrix Generation for Complex Node Representations", I. Iliadis & P. Scotton, IEEE ATM Workshop, Kochi City, Japan, May 27, 1999. This method is based on the minimum spannmg tree growth suggested by the Kruskal and Prim algorithms discussed in the publication of T. H. Cormen mentioned above. The basic principle is to add to a spanning tree (or spanning forest) the safest possible edge at each step. This ensures that, at each step of its growth, the spanning tree (or forest) is minimal. The method employed requires costs to be symmetrical. That is, the cost of a given link is taken to be the same in both directions so that, in effect, only one cost is associated with a given link/path regardless of direction.

SUMMARY OF THE INVENTION

According to one aspect of the present invention there is provided a method of generating a set of restrictive costs associated with directional paths between selected nodes in a group of nodes of a network system wherein each node in the group is connected by a link to at least one other node in the group, and each link has a pair of directional costs associated therewith such that each link can be considered as a pair of oppositely-directed, unidirectional links each of which extends from a source node to a destination node and has a said directional cost associated therewith. The method comprises the steps of:

(a) assigning a unique identifier to each of the selected nodes;

(b) selecting said unidirectional links in order of cost;

(c) for each unidirectional link selected, if a said identifier has previously been assigned to the source node for that link and that identifier has not previously been assigned to the destination node for that link, assigning that identifier to the destination node and any further nodes, which are reachable from the destination node by traversing unidirectional links selected thus far, to which that identifier has not previously been assigned;

(d) if step (c) results in assignment to a said selected node of a said identifier not previously assigned to that selected node, storing the directional cost of the last-selected unidirectional link as the restrictive cost for the directional path to that selected node from the selected node to which that identifier was initially assigned in step (a); and (e) repeating steps (b) to (d) at least until a restrictive cost has been stored for directional paths between predetermined pairs of said selected nodes.

In another aspect of the invention, methods embodying the present invention provide for generation of a restrictive cost set for a group of nodes in a highly efficient manner, allowing asymmetric costs, rather than merely symmetric costs, to be taken into account. Where there is more than one path in a given direction between a pair of nodes for which a restrictive cost is required, then the restrictive cost of the best path will be generated, and restrictive costs can be obtained for paths in both directions between a given pair of nodes.

In another aspect of the invention, where the cost of a link is defined in accordance with the convention that the lower the cost, the better the link, then step (a) will select the unidirectional links in order of increasing cost to ensure the restrictive costs generated are always those of the lowest-cost paths. However, in some embodiments costs could be defined differently, ie., the higher the cost the better the link.

For example, the "cost" could be directly proportional to the parameter, such as bandwidth, by which a link is measured, or the cost might be that parameter itself. In cases where the costs are defined in such a way, the links will be selected in order of decreasing cost, and a resulting restrictive cost will be the minimum of the costs of the constituent links in the path between the selected nodes.

In a preferred embodiment, the present invention, the network system is applied to comprise a single network or an internetwork, and the group of nodes over which the restrictive costs are generated may be an entire network or a subset of the nodes in a particular network or internetwork, such as a PNNI peer group for example. The restrictive costs are generated for directional paths between selected nodes of the group. The selected nodes may be border nodes of the group so that restrictive costs will be generated for paths traversing the group. Applications can be envisaged, however, where the selected nodes are some other subset of two or more nodes in the group, or even all nodes in the group.

The identifier assigned to each selected node is unique in the sense that it is different from the identifier assigned to each other selected node. Any suitable identifiers may be used, such as colors, markings, flags, numbers, letters and the like.

In accordance with step (e) of the above method, steps (b) to (d) are repeated at least until a restrictive cost has been stored for directional paths between predetermined pairs of said selected nodes. It will usually be desirable to obtain the restrictive cost for directional paths between all pairs of selected nodes. Preferred embodiments will find such paths as discussed below, and in these preferred embodiments said predetermined pairs of selected nodes are all pairs of the selected nodes. Depending on the particular structure of the node group, however, the restrictive cost for a path between two of the selected nodes may be determined by the restrictive costs stored for two other paths. In particular, if the only path between two selected nodes, node A and node B, is via a third selected node, node C, then the restrictive cost for path A–C is the maximum of the restrictive costs of paths A–B and B–C. Here, once the costs for paths A–B and C–D have been stored, the cost for path A–C is known. Thus, where it is desired to know the restrictive costs for directional paths between all pairs of selected nodes, in some embodiments said predetermined pairs of selected nodes may be all pairs for which there exists a path through the group between the two nodes of the pair which path does not pass through another selected node. Steps (b) to (d) will then be repeated at least until restrictive costs have been stored for directional paths between these pairs of selected nodes. In some embodiments of the invention, the method may be implemented in such a way that the iterations of steps (b) to (d) cease when restrictive costs have been stored for these node pairs. Other embodiments may be implemented in such a way that the iterations cease when a restrictive cost has been stored for directional paths between all pairs of selected nodes. Other embodiments could of course continue the iterations of steps (b) to (d) in any case until all links have been selected.

In accordance with step (c) of the above method, an identifier previously assigned to the source node could be assigned to the destination node and said further nodes even if that identifier has previously been assigned to that destination node. Similarly, the identifier could be assigned to all nodes reachable from the destination node via unidirectional links selected thus far, not just those further nodes to which that identifier has not previously been assigned. However, to avoid unnecessary processing, it is preferred that the identifier is only assigned to the destination node and said further nodes if that identifier has not previously been assigned to that destination node, and then only to said destination node and further nodes. Also, in step (c) of preferred embodiments, any identifier previously assigned to the source node and not the destination node is assigned to the destination node and said further nodes. In alternative embodiments discussed below, however, if the source node is a said selected node in step (c), then only the identifier initially assigned to that selected node in step (a) may be assigned to the destination node and said further nodes, and not any other identifier which has been assigned to the selected node.

In accordance with another preferred embodiment of the present invention, data indicative of the directional costs associated with links may be stored in the system in various ways, and the links may selected in order of cost in dependence on this data, for example by searching the cost data each time to find the next highest value. In preferred embodiments, however, the method includes generating a list of said unidirectional links sorted by order of cost. In such embodiments, links may be selected in step (b) by selecting successive entries from the list In another aspect of the instant invention, the restrictive cost set generated by methods embodying the invention can be used in different ways according to the nature of the particular network system. For example, the restrictive costs could be used by one or more nodes in the group, e.g., border nodes, to select a path for routing a call across the group within a specified cost constraint for the call or to minimize the connection cost for the call. In some systems, such as PNNI systems for example, data indicative of the restrictive costs may be "advertised" outside the group by distributing data indicative of the costs as part of the topology data sent to other nodes in the system. In such cases, the cost data could be used for path selection and call routing both by nodes within the group and nodes outside the group. Accordingly, a further aspect of the present invention provides a method of distributing topology data in a network system including a group of nodes which comprises a plurality of border nodes, each border node being connected to another node of the network system outside said group, and in which each node in the group is connected by a link to at least one other node in the group, and each link has a pair of directional costs associated therewith such that each link can be considered as a pair of oppositely-directed, unidirectional links each of which extends from a source node to a destination node and has a said directional cost associated therewith, the method comprising:

generating a set of restrictive costs associated with directional paths between said border nodes by a method as described above; and transmitting topology data indicative of said set of restrictive costs to at least one node of the network system outside said group.

Another preferred embodiment of the present invention provides a method of selecting a path for routing a call across a group of nodes in a network system wherein the group of nodes comprises a plurality of border nodes, each border node being connected to another node of the network system outside said group, each node in the group is connected by a link to at least one other node in the group, and each link has a pair of directional costs associated therewith such that each link can be considered as a pair of oppositely-directed, unidirectional links each of which extends from a source node to a destination node and has a said directional cost associated therewith, the method comprising:

generating a set of restrictive costs associated with directional paths between said border nodes by a method as described above; and selecting a path for routing of the call via a pair of said border nodes in dependence on said set of restrictive costs.

In a general aspect of the present invention, features are described therein with reference to a method of the invention, corresponding features may be provided in apparatus according to the invention, and vice versa. Thus, for example, a further aspect of the present invention provides apparatus for generating a set of restrictive costs associated with directional paths between selected nodes in a group of nodes of a network system wherein each node in the group is connected by a link to at least one other node in the group, and each link has a pair of directional costs associated therewith such that each link can be considered as a pair of oppositely-directed, unidirectional links each of which extends from a source node to a destination node and has a said directional cost associated therewith, the apparatus comprising memory for storing the restrictive costs, and control logic configured to:

(a) assign a unique identifier to each of the selected nodes;

(b) select said unidirectional links in order of cost;

(c) for each unidirectional link selected, if a said identifier has previously been assigned to the source node for that link and that identifier has not previously been assigned to the destination node for that link, to assign that identifier to the destination node and any further nodes, which are reachable from the destination node by traversing unidirectional links selected thus far, to which that identifier has not previously been assigned;

(d) if step (c) results in assignment to a said selected node of a said identifier not previously assigned to that selected node, to store in said memory the directional cost of the last-selected unidirectional link as the restrictive cost for the directional path to that selected node from the selected node to which that identifier was initially assigned in step (a); and (e) to repeat steps (b) to (d) at least until a restrictive cost has been stored for directional paths between predetermined pairs of said selected nodes.

The invention further provides: a device for connection as a node in a network system which device comprises apparatus as described above; and also a network system comprising a plurality of nodes at least one of which comprises such a device.

A still further aspect of the present invention provides a computer program element comprising computer program code means which, when loaded in a processor of a device in a network system comprising a group of nodes, configures the processor to perform a method as described above.

For a better understanding of the present invention, together with other and further features and advantages thereof, reference is made to the following description, taken in conjunction with the accompanying drawings, and the scope of the invention that will be pointed out in the appended claims.

DETAILED DESCRIPTION OF THE PREFERRED EMBODIMENT

In the following, an embodiment of the method for generating a set of restrictive costs will be described for the case where the method is applied to generate the restrictive cost matrix, or "transition matrix", for a PNNI peer group. Before describing the transition matrix generation process, it is useful first to consider PNNI networks in more detail.

Figure 1:
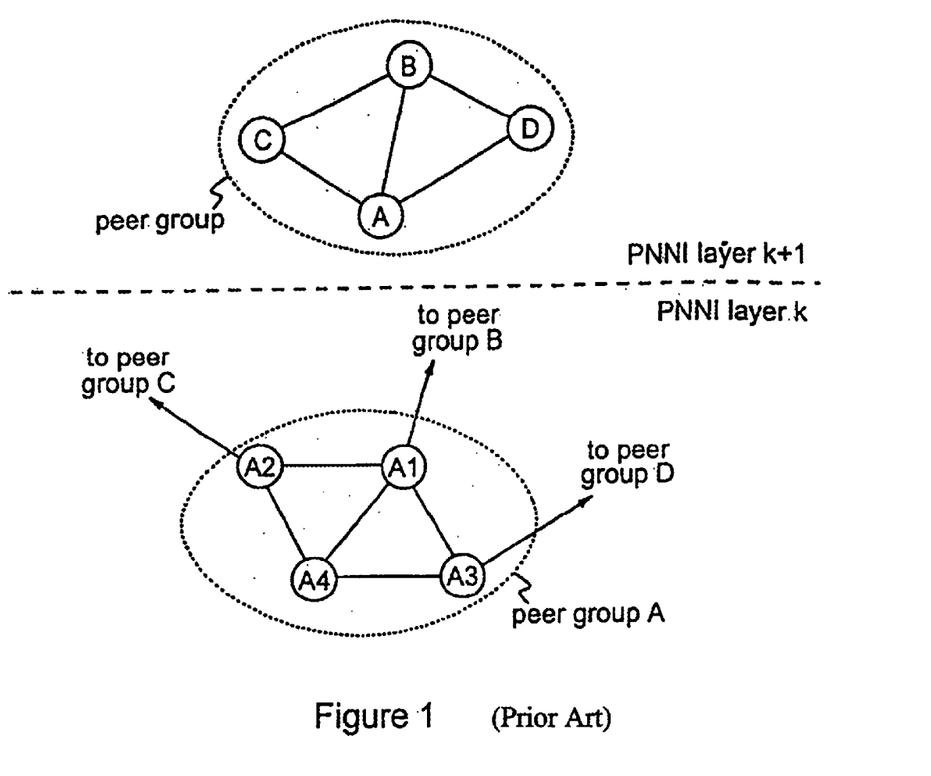
FIG. 1 illustrates the process of topology abstraction in a PNNI hierarchical network.

PNNI (Private Network-to-Network Interface) is a hierarchical, dynamic link-state routing protocol defined by the ATM (Asynchronous Transfer Mode) Forum for use in ATM networks. The hierarchy extension and the use of a single routing protocol at all levels of the hierarchy allow the support for large-scale ATM networks. Among the major characteristics of the protocol are signaling for switched virtual circuits (SVCs), dynamic routing capabilities, and support for quality of service (QoS) parameters. As already mentioned, a key feature of the protocol is the ability to cluster network nodes into manageable groups called "peer groups". One node in each peer group serves as the peer group leader and represents that peer group as a logical group node in the next layer up of the hierarchy. This concept is illustrated schematically in FIG. 1 of the accompanying drawings. In the figure, a peer group A in PNNI layer k consists of four nodes A1, A2, A3 and A4. Three of these nodes, nodes A1, A2 and A3, are border nodes. Each border node has a link connecting peer group A to another peer group (not explicitly shown in layer k), here peer groups B, C and D respectively. The topology in layer k is abstracted in the next layer up of the hierarchy, ie. layer k+1, such that each layer k peer group is represented as a single logical node in layer k+1. Thus peer group A is represented by node A in layer k+1, peer group B is represented by node B in layer k+1, and so on. In the figure, nodes A, B, C and D themselves form a peer group in layer k+.

ATM is a source routing technology. To enable source route computation and to support QoS, the nodes must maintain information about the network topology. PNNI thus defines a system for the creation and distribution of topology data within a network. The topology data is defined by PNNI Topology State Elements (PTSE's) which are created and distributed by nodes so that each node can maintain a topology database which defines its view of the network. PTSE's include data defining topology characteristics derived from link or node state parameters. PTSE's are flooded among nodes in a peer group so that each peer group node has the same topology database and thus the same view of the network. In the next level up of the hierarchy, however, the peer group topology is abstracted as described above, so that only the abstracted topology is seen by nodes sharing a peer group at this level. It is this topology abstraction that reduces the resources required to define very large networks.

Call establishment in PNNI consists of two operations: the selection of an optimal path and the setup of the connection state at each point along the path. For accuracy in path selection, and to allow cost considerations to be taken into account, PNNI provides a way to represent a peer group as a logical group node which has a structure that is more sophisticated than a single node. This representation is known as the "complex node representation". The complex node representation can be derived in various ways by considering the costs associated with links in a peer group. The starting point for deriving a complex node representation is the "transition matrix" for the peer group. The transition matrix defines the restrictive costs of the optimal (lowest cost) paths across the peer group between pairs of the border nodes. The complex node representation will be discussed further below, but it is useful first to consider some underlying principles.

In general, a network can be modeled by an orientated graph in which:

a node of the network is referenced as a vertex of the graph; and a link between nodes is referenced as an edge between two vertices of the graph.

Let G(V, E) be the graph representing the network at a given point in time. Here, V is the set of vertices and E the set of directed, or directional, edges. Thus, for all $v_i, v_j \in V$, if $v_i$ and $v_j$ are connected, the edge $\epsilon_{v_i,v_j} \in E$. Let $v_x$ and $v_y$ be two vertices of the graph G(V, E). The path $$v_x \xrightarrow{P_{x,y}} v_y$$

is a sequence of n vertices such that:

$$P_0 = v_x$$

$$P_{n-1} = v_y$$

$$\exists \varepsilon p_i, p_{i+1} \in E \forall \ i \in [0, \ldots, n-2]$$

The length of a path is the number of edges in the path. If the path does not exist, $P_{x,y} = \{\emptyset\}$. In this case the path is said not to be feasible.

Let us now associate a cost with an edge. For an edge $\epsilon_{v_i,v_j} \in E$, such a cost will be $C(\epsilon_{v_i,v_j}) \in N$. (To be more general one could consider $C(\epsilon_{v_i,v_j}) \in R^+$, but, since the PNNI protocol only allows integer representations, in the following only integer values will be considered. It is to be noted, however, that the present invention can be applied to non-integer costs). The restrictive cost of a path is the maximum of the costs of the traversed edges. Thus, for a feasible path $P_{x,y}$ from $v_x$ to $v_y$ of length n, the restrictive cost will be:

$$C_r(P_{x,y}) = \max_{i=0 \ to \ n-2} \{C(\varepsilon p_i, p_{i+1})\}.$$

If the path is not feasible then $$C_r(P_{x,y}) = \infty.$$

As noted earlier, a pair of directional costs can be associated with a link in a network, each associated with traversing the link in a different direction. Thus, a link can be considered as a pair of oppositely-directed, unidirectional links each of which has an associated cost. In terms of edges between vertices $v_i$ and $v_j$ representing the two nodes connected by a link, the unidirectional links correspond to edges $\epsilon_{v_i,v_j}$ and $\epsilon_{v_j,v_i}$, and the associated direct $C(\epsilon_{v_i,v_j})$ and $C(\epsilon_{v_j,v_i})$ respectively. Where only symmetric costs are considered, then one cost $C^s$ is associated with a link regardless of direction. This symmetric cost $C^s$ is the maximum of the costs for the two directions:

$$C^s(\epsilon_{v_i,v_j}) = C^s(\epsilon_{v_j,v_i}) = \max\{C(\epsilon_{v_i,v_j}), C(\epsilon_{v_j,v_i})\}$$

However, to avoid loss of information it is desirable to allow the costs in the two directions to be different or "asymmetric". This of course allows restrictive costs of paths to be asymmetric also, so that the cost of traversing the path can be different in the two directions.

Figure 2:
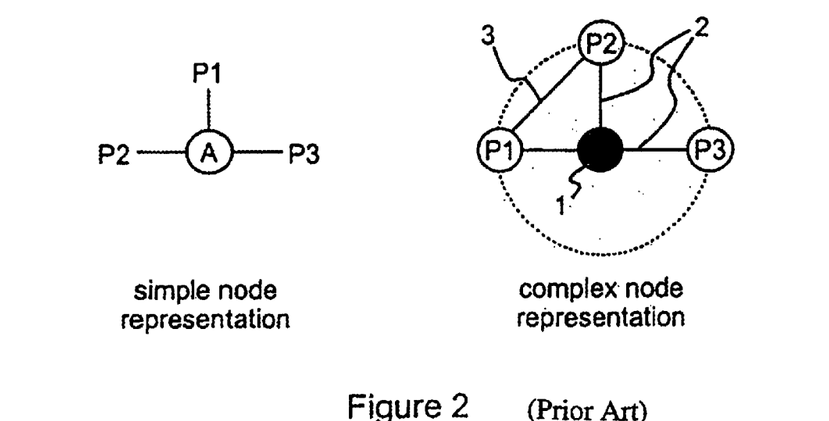
FIG. 2 illustrates two different representations of a logical group node in a PNNI hierarchical network.

As mentioned earlier, the PNNI protocol authorizes two ways of representing a PNNI peer group in a higher layer: as a "simple node"; or as a "complex node". An example of these two representations is shown in FIG. 2. The simple node representation shows the peer group as a single node A having ports P1, P2 and P3 connecting the node to external links, i.e., links to neighboring peer groups. The simple node representation is simple to construct and use but does not give information about the cost of traversing the peer group. The principle of the complex node representation is to map the simple node to a representation where:

the nucleus 1 is a vertex representing the node itself;

the nucleus 1 is connected via spokes 2 to a set of vertices P1, P2 and P3 each representing a port in the simple node representation; and optionally, vertices representing ports can be directly connected by "exception bypasses" 3.

Note that spokes 2 and exception bypasses 3 are actually normal edges belonging to the graph. As noted earlier, the complex node representation is derived from the transition matrix for the peer group and indicates the cost of traversing the peer group, allowing such costs to be taken onto account for path selection and other purposes. The drawback is the increased processing complexity involved in generating the complex node representation and using this representation when computing routes (since there are more vertices and edges than in the case of the simple node representation). The complex node representation can be derived for various kinds of costs, and can be derived for both symmetric and asymmetric costs, though information is preserved by using asymmetric costs as explained above. Once the transition matrix for a peer group has been generated then the complex node representation can be derived in accordance with various known algorithms which need not be discussed in detail here. The problem addressed by the embodiment of the invention described below is how to generate the transition matrix in an efficient manner using asymmetric costs. In particular, using the modeling technique described above, if the peer group is represented by a graph G(V, E) having N border vertices $b_0, \ldots, b_{N-1} \in V$, then the object is to generate the set of restrictive costs defined by the transition matrix:

$$\begin{pmatrix} 0 & C_r(P_{b_0,b_1}) & \cdots & C_r(P_{b_0,b_{N-1}}) \\ C_r(P_{b_1,b_0}) & \cdots & \cdots & \cdots \\ \cdots & \cdots & \cdots & \cdots \\ C_r(P_{b_{N-1},b_0}) & \cdots & \cdots & 0 \end{pmatrix}$$

Figure 3:
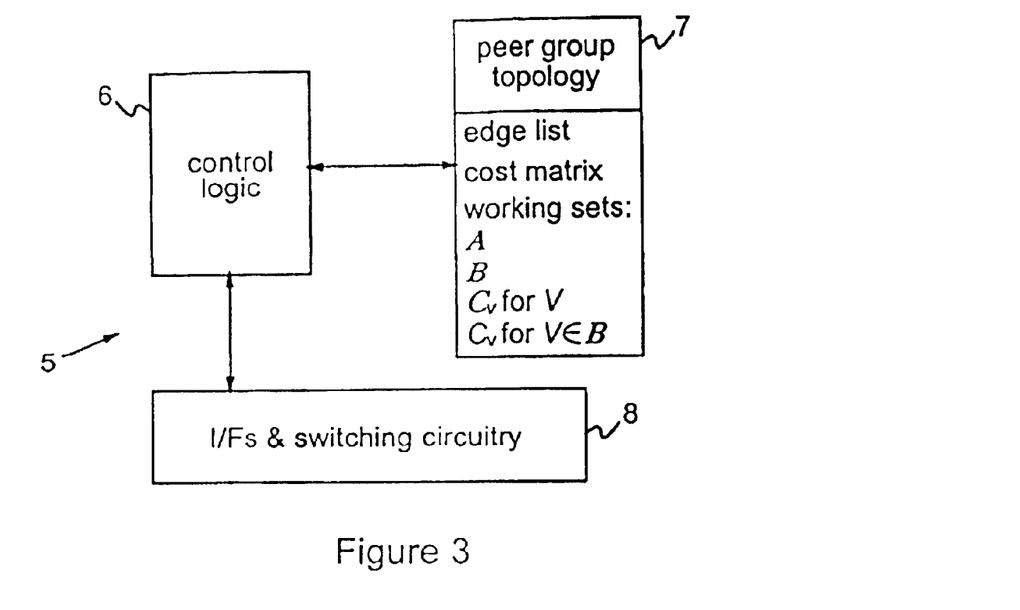
FIG. 3 is a schematic illustration of a network device for implementing methods embodying the invention.

FIG. 3 is a block diagram illustrating a network device for implementing the transition matrix generation process. In general such a device may be a switch, router, bridge, brouter or other network device, though only the main elements of the device are shown in this schematic representation. As illustrated, the device 5 comprises a control unit 6, a memory 7 and circuitry 8 which represents the interfaces (I/Fs) and switching fabric which connect the device with its links to neighboring nodes and via which the device communicates with the rest of the network. The control unit 6 controls operation of the device generally, and includes control logic which is configured to implement the transition matrix generation process described below. The control logic may be implemented in hardware or software, or a combination thereof, and suitable implementations will be apparent to those skilled in the art from the following description. In particular, the control unit 6 may be implemented by a suitably programmed processor, and the memory 7 may be an internal memory of the processor or an external memory associated with the processor. Where the matrix generation logic is implemented in software, the program code may be supplied separately (as an independent element or an element of the code for a number of control functions) for loading in a processor to configure the processor to operate as described.

As indicated schematically in the figure, the memory 7 is used for storage of various data used by the matrix generation process embodying the invention. In the present case, this data includes a peer group topology database in which details of the peer group of which the device is a member are maintained in known manner. This topology data includes details of the nodes and links and the directional costs associated with the links. The additional data indicated in the figure consists of: an edge list, which is generated from the topology data as described further below; the cost matrix for which entries are generated in operation; and various working data which comprises data sets A, B, and $C_v$, defined below and identifiers $C_v$ which are assigned to the border nodes as explained below.

Figure 4:
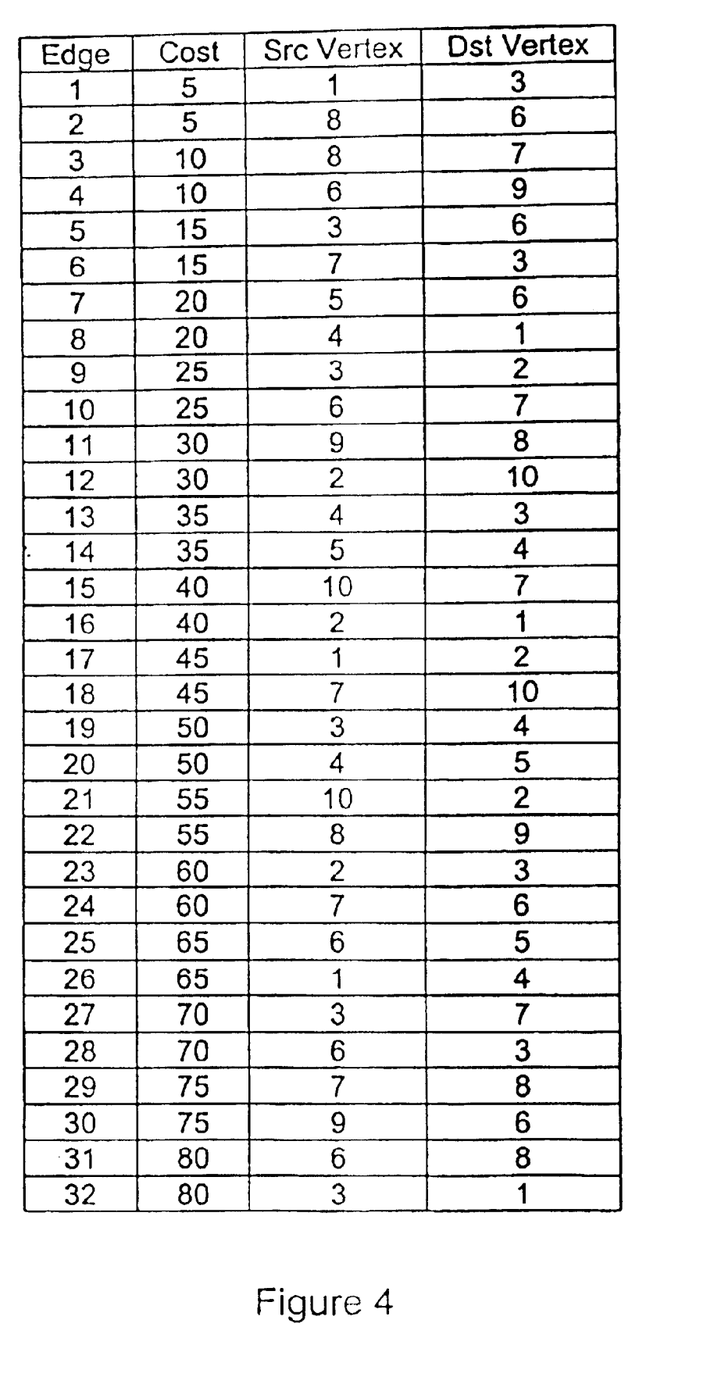
FIG. 4 is a schematic representation of an edge list used in embodiments of the invention.

FIG. 4 is a schematic representation of an edge list generated by the control unit 6 for a sample peer group. This lists the edges, or unidirectional links, between pairs of the border vertices corresponding to border nodes of the peer group, sorted in order of increasing cost. For each entry the source (src) vertex and destination (dst) vertex of the edge are given. This list is generated by the control unit 6 from the topology data stored in the peer group topology database of memory 7 as will be apparent to those skilled in the art. While one particular representation of an edge list is shown here, there are of course many ways to represent the information contained in such a list. For example, the edge list might be a logically sorted list in which the actual entries are not presented in cost order but pointers are used to indicate the cost order.

The steps implemented by the control unit 6 in this embodiment to generate the transition matrix for a peer group are defined by the algorithm presented below in which the following definitions and functions are used.

Definitions:

E Contains the list of edges sorted by increasing cost.
A Contains the list of "active" edges.
M[.][.] The transition matrix.
B The set of border vertices.
$C_v$ The color of border vertex V. Defined for V∈B.
$C_v$ The set of colors of vertex V.

Used Functions:

GetFirstEdge Gets and removes the first edge from the list of edges.
SrcVertex Returns the source vertex of an edge.
DstVertex Returns the destination vertex of an edge.
Getcost Returns the cost of traversing an edge.
GetNewColor Returns an unused color.
GetBorderNode Returns the border node that originated a given color.

Figure 5A:
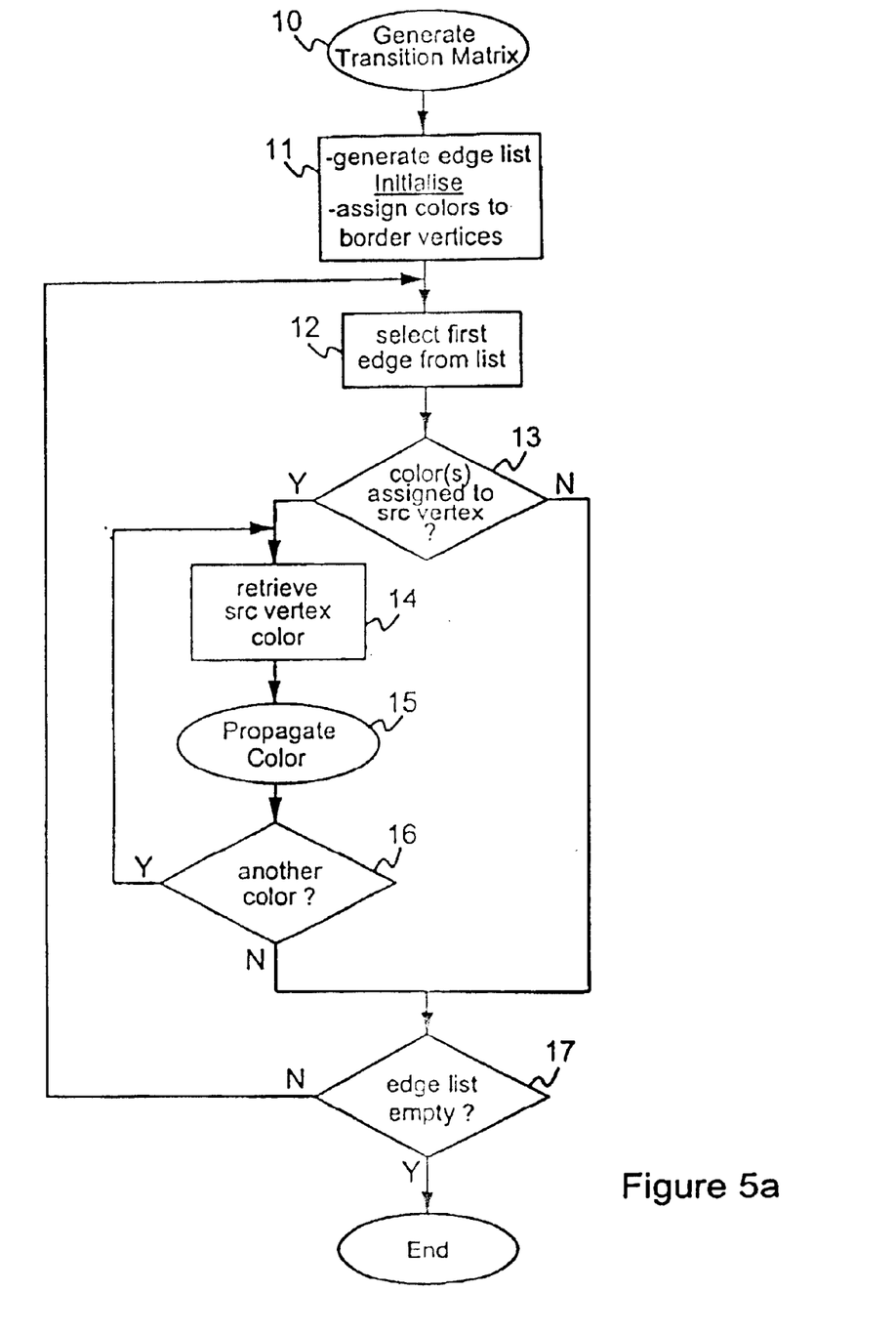
FIGS. 5*a* and 5*b* are flow charts illustrating the process of generating a restrictive cost matrix in an embodiment of the invention.
Figure 5B:
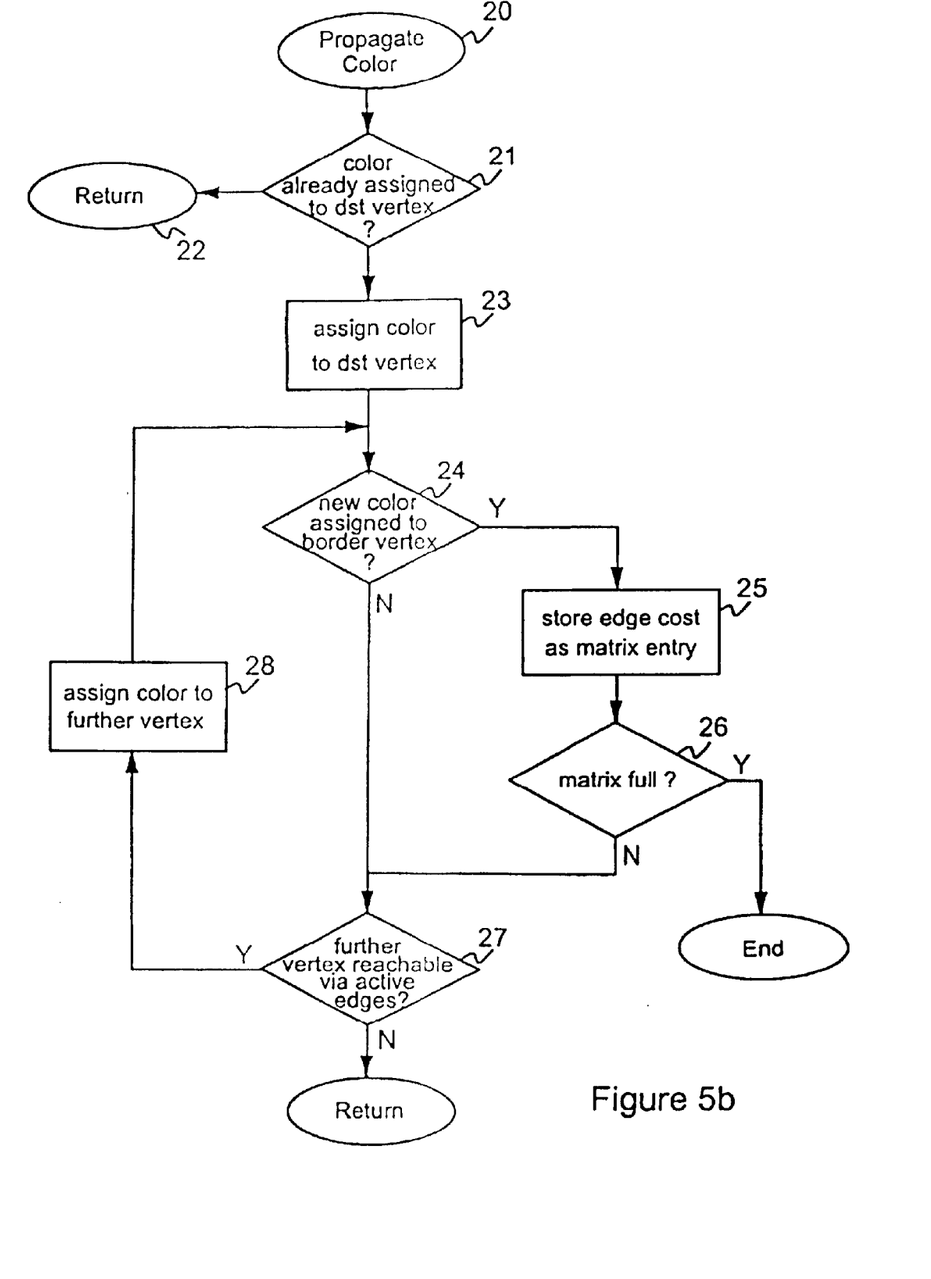

The process begins with the following initialization steps.
Initialization:

$\forall x \neq y: M[x][y] := \infty$;
$\forall x: M[x][x] := 0$;
$\forall V: C_v := \{\emptyset\}$;
$\forall V \in B: C_v := \text{GetNewColor}(\ )$;
$\forall V \in B: C_v := \{C_v\}$;
$A := \{\emptyset\}$;

The algorithm itself consists of two parts:
Algorithm, Part 1:

while (E≠{∅})do
   e:=GetFirstEdge(E);
   A:=A∪{e};
   S:=Src Vertex(e)
   D:=DstVertex(e)
   ∀c∈Cs: PropagateColor(D, c, e);
done Algorithm, Part 2:

PropagateColor(vertex V, color c, edge e)
1 if c∈$C_v$ then return; end if;
   $C_v$:=$C_v$∪{c};
   if((V∈B)^($C_v$≠c)) then
     S:=GetBorderNode(c);
     M[S][V]:=GetCost(e);
     if ∀i,j: M[i][j]≠∞ then STOP; end if;
   end if;
   ∀(e∈A^SrcVertex(e)=V): PropagateColor(DstVertex(e), c, e);
end;

FIGS. 5a and 5b are flow charts representing the steps of the algorithm in simplified form. FIG. 5a corresponds generally to the first part of the algorithm and FIG. 5b to the second part. Referring first to FIG. 5a, the process begins when the transition matrix is to be generated as indicated by step 10. (This may be, for example, on initial set up of a network or when the peer group topology changes through addition or removal of a link or node for example. The device 5 which implements the process may be the peer group leader for example, or all border nodes, or even all nodes in the peer group, might generate the transition matrix independently in some cases.) In step 11 the edge list (corresponding to set E in the algorithm) is generated and stored in memory 7. The initialization process is also performed in this step. This involves setting the initial state of the matrix M such that all entries are ∞ except for the diagonal entries (M[x][x]) which are set to zero. The set of active edges A, and the set of colors $C_v$ for each vertex V, are initialized. Further, each of the border vertices is assigned a unique identifier, in this case a "color" $C_v$ (for V∈B ). This color is also added to the set of colors $C_v$ for each vertex V∈B.

Next, in step 12, the first (lowest cost) edge is selected from the edge list E. This edge is thereby removed from the edge list and added to the set A of active edges. Thus, an "active" edge is an edge which has been selected and removed from the edge list. The source and destination vertices of the selected edge are identified from the edge list, and step 13 checks whether any colors have been assigned to the source vertex S. If not, (i.e., $C_S=\{\emptyset\}$), then operation proceeds directly to step 17 discussed below. However, if any colors have been assigned to the source vertex ($C_S=\{\emptyset\}$), as indicated by a "Yes" at step 13, then in step 14 the first color in $C_S$ is retrieved as the current color c. Next, in step 15, the "Propagate Color" function is invoked and operates for the current color c. The Propagate Color function is defined by the second part of the algorithm which is represented by FIG. 5b.

Referring to FIG. 5b, the Propagate Color function is invoked at step 20 (which corresponds to step 15 of FIG. 5a as just described). In step 21 the control unit checks whether the color c has already been assigned to the destination vertex for the current edge, i.e., whether c∈$C_v$ for the destination vertex V. If so, then the color need not be propagated again and in step 22 operation returns to the step in FIG. 5a at which the function was invoked, ie. step 15. However, if a "No" is obtained at step 21, then in step 23 the color c is assigned to the destination vertex for the edge ($C_v$:=$C_v$∪{c}). Step 24 then checks whether the destination vertex is a border vertex to which a new color (i.e., different to the unique color initially assigned to that border vertex) has been assigned by step 23. If so, then a path across the peer group has been found and the transition matrix is updated in step 25. Specifically, the cost of the last-activated edge (i.e., the edge e last selected in step 12 of FIG. 5a) is stored as the matrix entry for the path to the current border vertex from the border vertex to which the current color c was initially assigned at the initialization stage. This corresponds to step M[S][V]:=Getcost(e) in the algorithm and will be illustrated further with reference to the example described below. Next, step 26 checks whether the matrix is full (i.e., ∀i,j: M[i][j]≠∞). If so the matrix generation process is complete and the operation terminates. If not, operation proceeds to step 27. Reverting to step 24, if the destination vertex for the current edge is not a border vertex to which a new color has been assigned, steps 25 and 26 are bypassed and operation proceeds directly to step 27. Either way, in step 27 the control unit checks whether any further vertices to which the current color c has not already been assigned are reachable from the current destination node by traversing (one or more of) any edges activated thus far, i.e., edges e∈A. If any such further vertices are found then, for the first of these, operation proceeds to step 28 where the current color is assigned to this vertex. Operation then reverts to step 24. If step 28 has not resulted in a new color being assigned to a border vertex as determined in step 24, then the process reverts to step 27 where, for the next of the "further vertices", if any, operation again proceeds to step 28. This loop continues until all of the further vertices reachable from the original destination node for the last activated edge have been assigned the current color, and no further vertices remain at step 27. In any pass of this loop, however, if step 24 detects that a new color has been assigned to a border node, then a new path across the peer group has been found and the process will implement steps 25 and 26 to update the matrix as before. Once all further vertices have been colored, operation returns from step 27 to the step in FIG. 5a at which the Propagate Color function was invoked, ie. step 15. From here, the process continues to step 16 of FIG. 5a which tests for any further colors in the set $C_S$ for the original source vertex of the last-activated edge. If there are any further colors in the set, then operation reverts to step 14 where the next color is retrieved as the current color. This will then be propagated by the Propagate Color function in step 15 as before. When all colors in $C_S$ have been dealt with in this way, a "No" at step 16 results in operation proceeding to step 17. Here, the control unit checks whether the edge list is empty, indicating that all edges have now been activated. If not, operation reverts to step 12 where the first edge remaining in the edge list is selected and activated as before.

The process described above thus continues until either the transition matrix is completed, as indicated by a "Yes" at step 26 of FIG. 5b, or until all edges have been activated and the edge list is determined to be empty in step 17 of FIG. 5a. Usually, the matrix will be completed before all edges have been activated as demonstrated in the example below.

Figure 6:
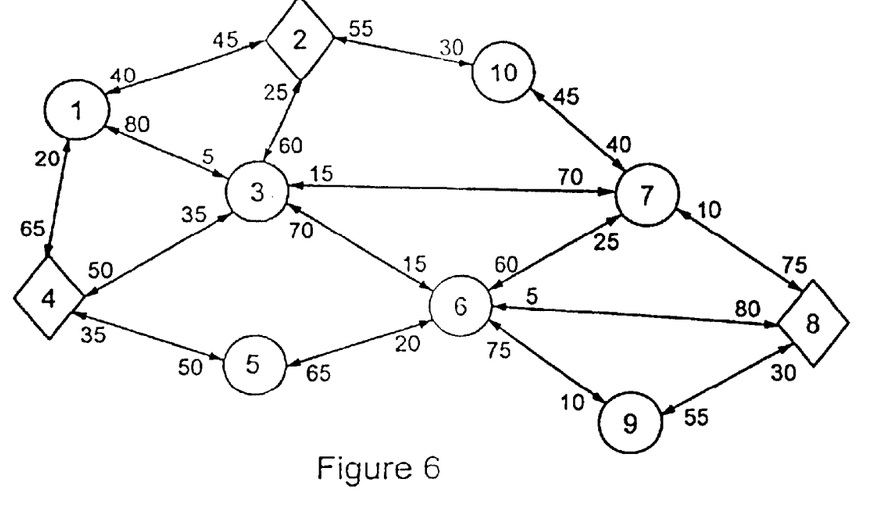
FIG. 6 illustrates the topology of a sample PNNI peer group for which operation of a method embodying the invention will be described.

FIG. 6 shows a PNNI peer group consisting of ten nodes, labeled 1 to 10 in the figure, three of which are border nodes. The border nodes are nodes 2, 4 and 8 and are differentiated by the diamond shapes in the figure. The nodes are interconnected by links as shown, and the asymmetric directional costs associated with these links are indicated by the numerals shown next to the arrowheads. The edge list of FIG. 4 corresponds to this peer group. FIGS. 7a to 7g illustrate schematically successive stages in the matrix generation process just described. In each of these figures the state of the transition matrix is shown in the top right hand corner.

Figure 7A:
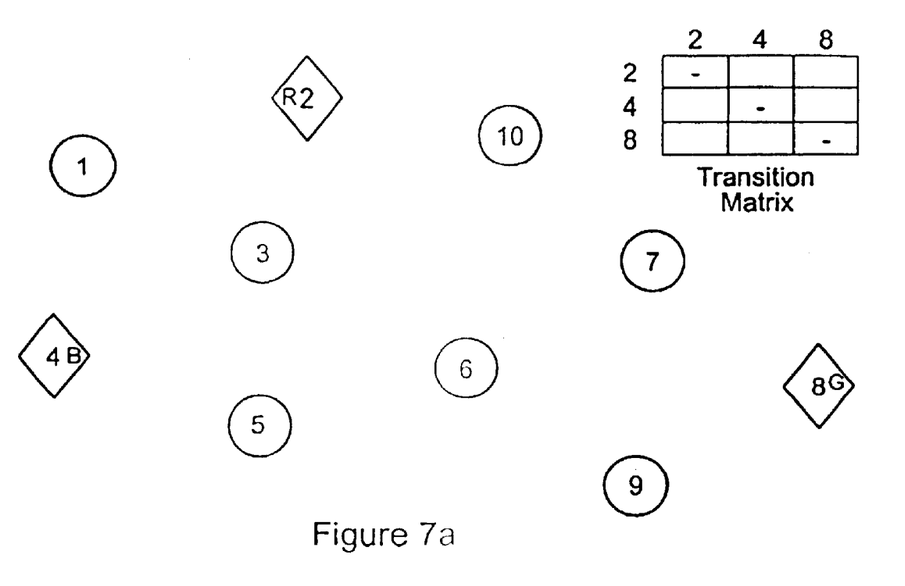
FIGS. 7*a* to 7*g* are schematic diagrams illustrating successive stages in operation of the cost matrix generation process.
Figure 7B:
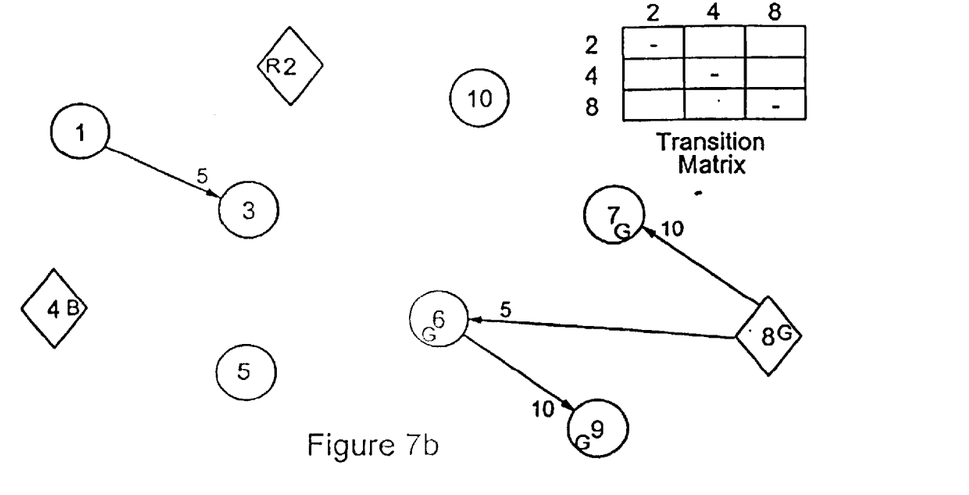

FIG. 7a illustrates the stage immediately following the initiazation process. Unique colors, here red (R), blue (B) and green (G), have been assigned to border nodes 2, 4 and 8 respectively. No edges have yet been activated as indicated by the absence of links in the figure. FIG. 7b illustrates the state after edges 1 to 4 from the edge list of FIG. 4 have been activated. Node 1 has no colors when edge 1 is activated so no color is propagated to node 3. However, activation of edge 2 propagates green to node 6, and activation of edges 3 and 4 propagates green to nodes 7 and 9.

Figure 7C:
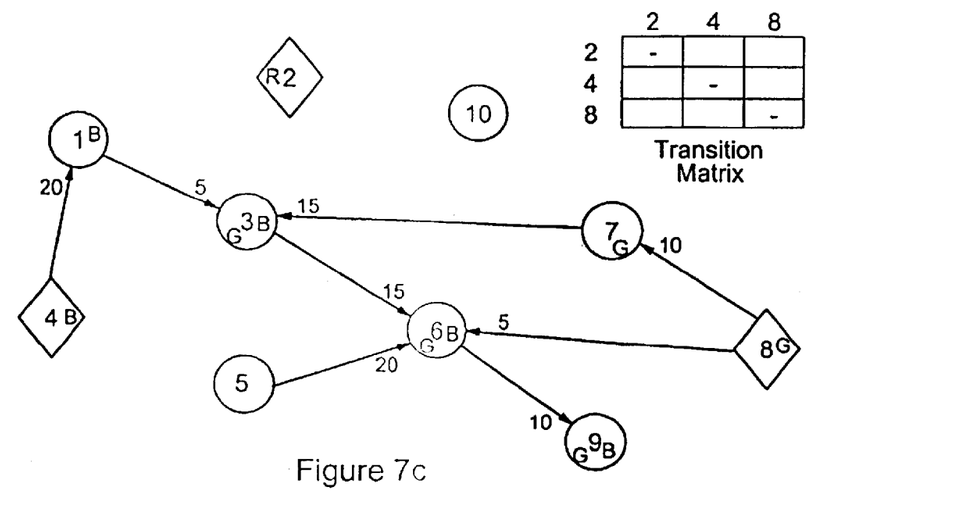

In FIG. 7c edges 1 to 8 have been activated. Activation of edge 5 propagates no colors. However, edge 6 propagates green to node 3 and all further nodes which are reachable from node 3 via edges activated thus far and which are not already colored green. Nodes 6 and 9 are already colored green in this case. Edge 7 propagates no colors, but edge 8 propagates blue to node 1 and all nodes which are not yet colored blue and which are reachable from node 1 via activated edges. Thus nodes 3, 6 and 9 also get colored blue.

Figure 7D:
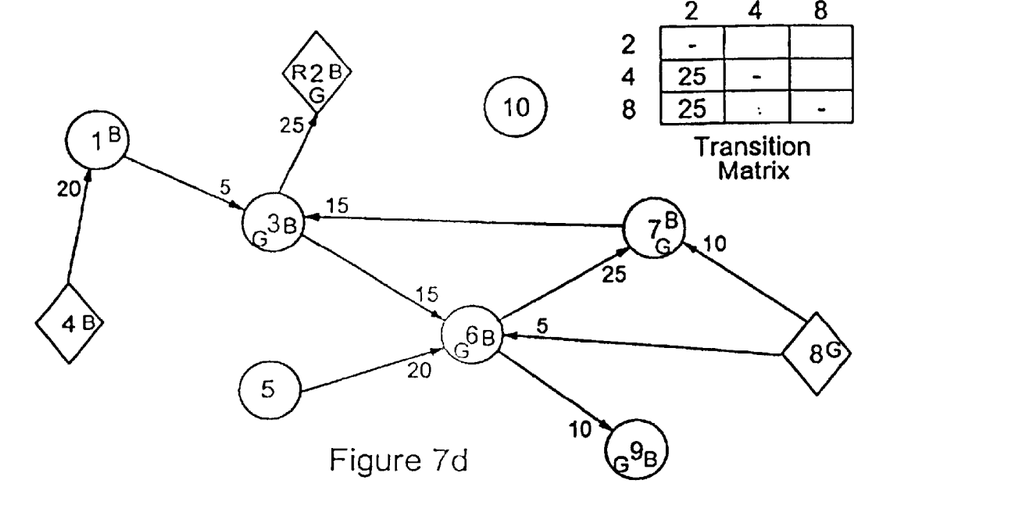

In FIG. 7d edges 9 and 10 have been activated. Edge 9 propagates green and blue to node 2. Node 2 is a border node and, since two new colors have been assigned to this node, two paths across the peer group have been found. These are the paths to node 2 from the border nodes to which the new colors were initially assigned, ie. nodes 4 and 8 for colors blue and green respectively. Thus restrictive cost entries are made in the matrix for paths $P_{4,2}$ and $P_{8,2}$ as indicated. In each case the entry is the cost of the last-activated edge, ie. 25 in both cases here.

Figure 7E:
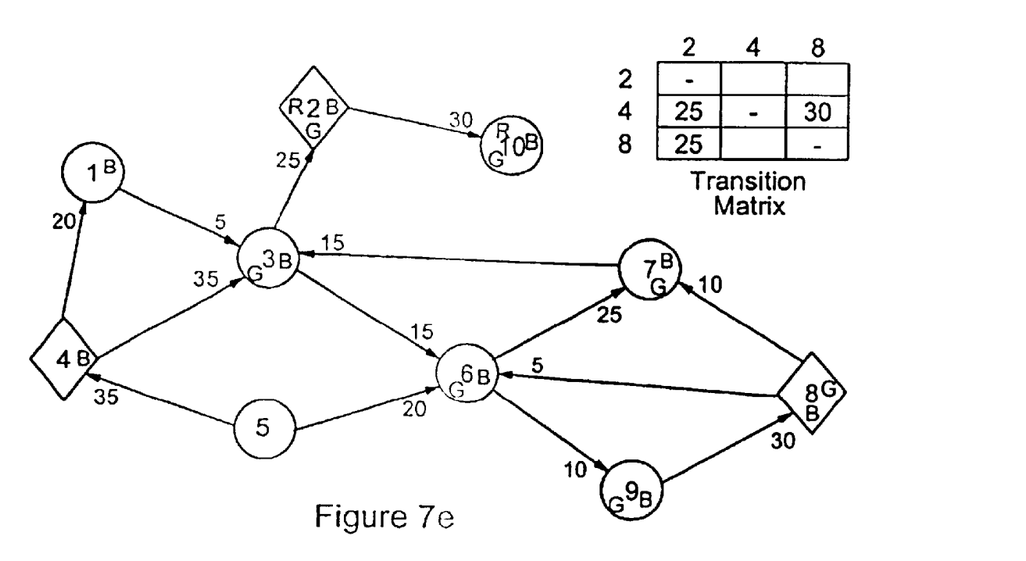
Figure 7F:
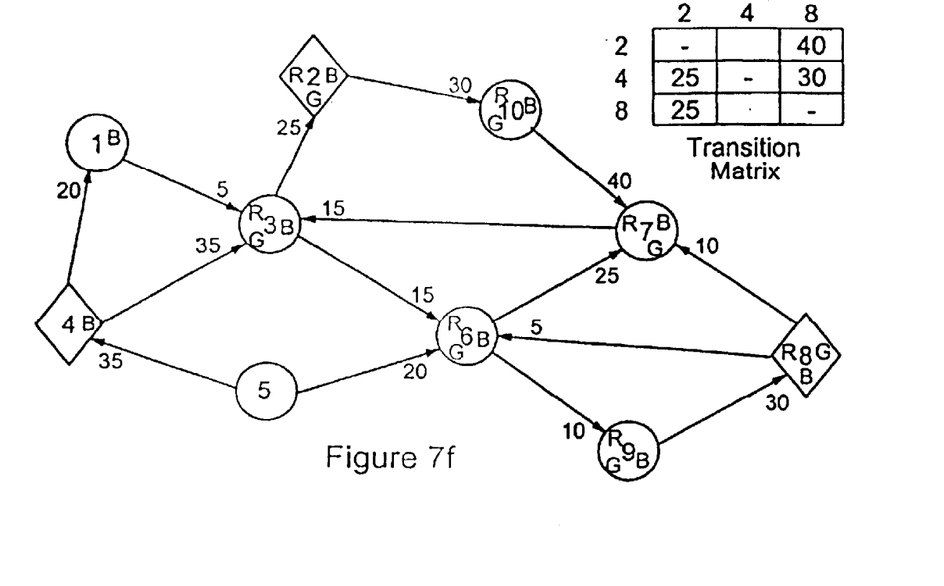
Figure 7G:
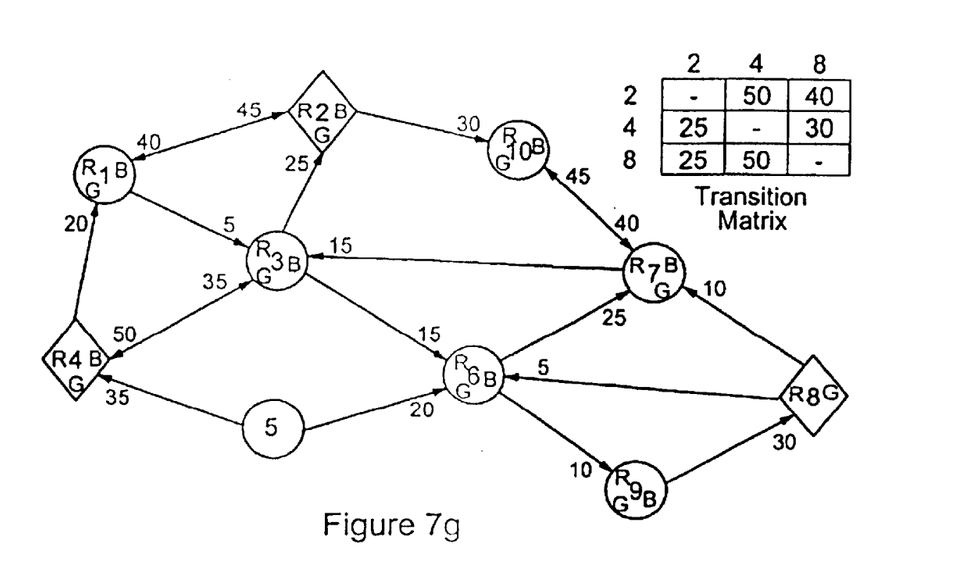

The colors continue to be propagated as more edges are activated, and each time a border node is colored with a new color the cost of the last-activated edge is stored as the matrix entry for the appropriate path. In FIG. 7e edges 1 to 14 have been activated, edge 11 having propagated blue to border node 8 giving M[4][8] as 30. In FIG. 7f edge 15 propagates red to nodes 7, 3, 6, 9 and 8 giving M[2][8] as 40. In FIG. 7g, nodes 1 to 19 have been activated and edge 19 has propagated red and green to node 4. Thus M[2][4] and M[8][4] are 50 and the transition matrix is full. The process therefore terminates (step 26 of FIG. 5b). Not all edges have been activated and not all vertices have been colored.

Note that, in the above process, processing is reduced by only propagating a color from a first node to a second node if that color has not already been assigned to the second node (This is a consequence of the step "if $c \in C_v$ then return" in part 2 of the algorithm which corresponds to steps 21 and 22 in FIG. 5b and also restricts the nodes considered in step 27 of FIG. 5b). Also, in this embodiment the process will find and store matrix entries for the restrictive costs of directional paths between all pairs of the border nodes. Even if the peer group is such that the only path between two border nodes, say nodes A and C, is via another border node B, then the cost of path A–C will be found as for any other path. However, the control logic could be configured to detect such a situation, automatically storing the matrix entry for path A–C (as the maximum of the entries for paths A–B and B–C) immediately the second of the two constituent paths is found. This could be achieved by inserting an additional step in the algorithm to check for this so-called "transitivity", and may result in the process terminating slightly faster in some cases. For example, the following step checking for transitivity could be inserted after the step M[S][V]:=GetCost(e) in the second part of the algorithm:

if $(\forall b \in B): (b \neq S)^{\wedge}(b \neq V)^{\wedge}(M[S,b]=\infty)^{\wedge}(M[V,b]\neq\infty)$ then
   M[S,b]:=GetCost(e); end
if;

In other embodiments, the process may be modified such that only "direct" paths between a pair of border nodes (ie. paths which do not pass through another border node) are detected. This could be achieved, for example, by modifying the algorithm such that, once a new color has been propagated out to a border node, that color is not propagated back in again. That is, if the source node of an edge is a border node, only the color initially assigned to that border node is propagated and not any other colors assigned subsequently to that border node. Here, if the only path between two border nodes is via another border node, this path would not be detected by the process, and the process would not terminate until all edges had been activated. This does not matter, however, since the appropriate matrix entry for such a path is the maximum of the cost entries for the two constituent paths and is therefore determined by the process in any case. Again, however, in such embodiments the control logic could be configured to automatically store the matrix entry for such a path when the costs for the two constituent paths have been obtained. The process could then terminate in dependence on whether the matrix is complete as above. Alternatively in such embodiments, the logic might simply terminate the process when the cost entries for all the paths which do not pass through another border node have been found since all required costs are then known. In any case, since it will usually be desired to know the restrictive cost for all matrix entries, it will be seen that the process should be designed to continue at least until the restrictive cost has been stored for directional paths between all pairs of border nodes for which there exists a path that does not pass through another border node.

Figure 8:
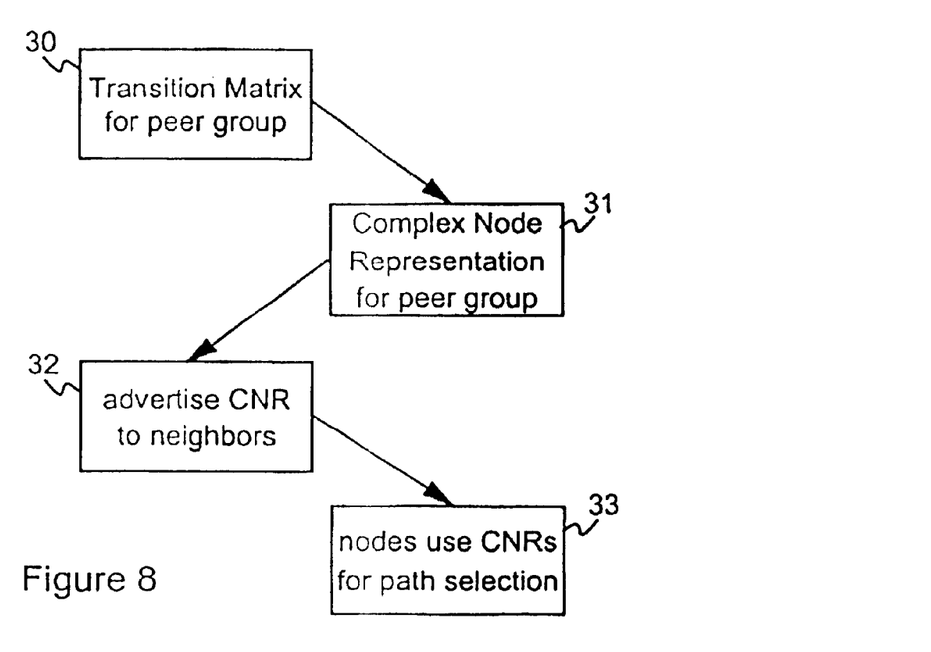
FIG. 8 illustrates schematically how the resulting cost matrix can be used in a network system embodying the invention.

It will be seen that the above provides a highly efficient system for generating the transition matrix for a peer group. The complexity of the algorithm employed is O(me), where m here is the number of border nodes and e the number of edges. This is significantly more efficient than algorithms such as the Floyd-Warshall and Johnson's algorithms mentioned earlier, particularly as in general m<<n. The resulting transition matrix may be used for various purposes as indicated for example by the schematic flow chart of FIG. 8. Once the transition matrix is obtained at step 30, the complex node representation (CNR) for the peer group can be derived as indicated at step 31. The CNR can be generated by the control unit 6 of the network device 5 in known manner, and the CNR-generation process need not be discussed here. Data defining the complex node representation can then be transmitted to neighboring nodes in the PNNI peer group in the next hierarchy level via the usual process for advertising topology data, as indicated by step 32. This data can then be used by network nodes for path selection and routing purposes as indicated by step 33, whereby the costs associated with traversing the peer group can be taken into account in these processes.

Although certain preferred embodiments of this invention have been described in detail with reference to the accompanying drawings, those skilled in the art should appreciate that the various changes and modifications may be made therein without departing from the spirit and scope of this invention. For example, while the method described above is applied to generate the transition matrix for a PNNI peer group, embodiments of the invention can be applied to determine restrictive costs for directional paths between selected nodes in other node groups and in other network systems. A further example is an IP/OSPF (Internet Protocol/Open Shortest Path First) network. Here, again, topology data is abstracted such that outside a given routing domain only reachable addresses, rather than link/node topology, are available. At present, the OSPF protocol does not involve considerations of restrictive cost, but there are proposals to incorporate such considerations for costs dependent on bandwidth in particular, and embodiments of the invention could be applied to advantage in such systems.

What is claimed is:

1. A method of generating a set of restrictive costs associated with directional paths between selected nodes in a group of nodes of a network system wherein each of said nodes in said group of nodes is connected by a link to at least one other of said nodes in said group, and each link has a pair of directional costs associated therewith such that said link can be considered as a pair of oppositely-directed, unidirectional links each of which extends from a source node to a destination node and has a said directional cost associated therewith, the method comprising:
   (a) assigning a unique identifier to each of said selected nodes;
   (b) selecting said unidirectional links in order of cost;
   (c) for each of said unidirectional links selected, if a said identifier has previously been assigned to said source node for a said link and a said identifier has not previously been assigned to said destination node for a said link, assigning a said identifier to said destination node and any further nodes, which are reachable from said destination node by traversing said unidirectional links selected thus far, to which a said identifier has not previously been assigned;
   (d) if said step (c) results in assignment to a said selected node of a said identifier not previously assigned to said selected node, storing said directional cost of the last-selected said unidirectional link as said restrictive cost for said directional path to said selected node from a said selected node to which said identifier was initially assigned in said step (a); and
   (e) repeating said steps (b) to (d) at least until said restrictive cost has been stored for said directional paths between predetermined pairs of said selected nodes.

2. A method according to claim 1 wherein, in said step (a), said unidirectional links are selected in order of increasing cost.

3. A method according to claim 1 wherein, in said step (e), said predetermined pairs of selected nodes are all pairs of said selected nodes.

4. A method according to claim 1 wherein, in said step (c), any said identifier previously assigned to said source node and not said destination node is assigned to said destination node and said further nodes.

5. A method according to claim 1 wherein, in said step (c), said identifier previously assigned to said source node is assigned to said destination node and said further nodes only if said identifier has not previously been assigned to said destination node, and then only to said destination node and said further nodes.

6. A method according to claim 1 including generating a list of said unidirectional links sorted by order of cost, wherein said step (b) comprises selecting successive entries from said list.

7. A method according to claim 1 wherein said selected nodes are border nodes of said group, each of said border nodes which is connected to another of said nodes of said network system outside said group.

8. A method according to claim 7 wherein said group of nodes is a peer group of a PNNI hierarchical network.

9. A method of distributing topology data in a network system including a group of nodes which comprises a plurality of border nodes, each of said border nodes being connected to another of said nodes of said network system outside said group, and in which each of said nodes in said group is connected by a link to at least one other of said nodes in said group, and each of said links has a pair of directional costs associated therewith such that each of said links can be considered as a pair of oppositely-directed, unidirectional links each of which extends from a source node to a destination node and has a said directional cost associated therewith, the method comprising:
   generating a set of restrictive costs associated with directional paths between said border nodes; and
   transmitting said topology data indicative of said set of restrictive costs to at least one of said nodes of said network system outside said group;
   wherein said set of restrictive costs is generated by:
   (a) assigning a unique identifier to each of said border nodes;
   (b) selecting said unidirectional links in order of cost;
   (c) for each of said unidirectional links selected, if a said identifier has previously been assigned to said source node for said link and said identifier has not previously been assigned to said destination node for said link, assigning said identifier to said destination node and any further of said nodes, which are reachable from said destination node by traversing said unidirectional links selected thus far, to which said identifier has not previously been assigned;

(d) if said step (c) results in assignment to a said border node of a said identifier not previously assigned to said border node, storing said directional cost of the last-selected of said unidirectional links as said restrictive cost for said directional path to said border node from one of said border nodes to which said identifier was initially assigned in said step (a); and (e) repeating said steps (b) to (d) at least until said restrictive cost has been stored for said directional paths between predetermined pairs of said border nodes.

10. A method according to claim 9 wherein said network system comprises a PNNI hierarchical network and said group of nodes comprises a PNNI peer group, wherein said method includes generating a complex node representation of said peer group from said set of restrictive costs, and wherein said topology data is indicative of said complex node representation.

11. A method of selecting a path for routing a call across a group of nodes in a network system wherein said group of nodes comprises a plurality of border nodes, each of said border nodes being connected to another of said nodes of said network system outside said group, each of said nodes in said group is connected by a link to at least one other of said nodes in said group, and each of said links has a pair of directional costs associated therewith such that each of said links can be considered as a pair of oppositely-directed, unidirectional links extending from a source node to a destination node having a said directional cost associated therewith, the method comprising:

generating a set of restrictive costs associated with directional paths between said border nodes; and selecting a path for routing of said call via a pair of said border nodes in dependence on said set of restrictive costs;

wherein said set of restrictive costs is generated by:

(a) assigning a unique identifier to each of said border nodes;

(b) selecting said unidirectional links in order of cost;

(c) for each of said unidirectional links selected, if a said identifier has previously been assigned to said source node for said link and said identifier has not previously been assigned to a said destination node for said link, assigning said identifier to said destination node and any further of said nodes, which are reachable from said destination node by traversing said unidirectional links selected thus far, to which said identifier has not previously been assigned;

(d) if said step (c) results in assignment to one of said border nodes of a said identifier not previously assigned to one of said border nodes, storing said directional cost of the last-selected unidirectional link as said restrictive cost for said directional path to said border node from one other of said border nodes to which said identifier was initially assigned in said step (a); and (e) repeating said steps (b) to (d) at least until said restrictive cost has been stored for said directional paths between predetermined pairs of said border nodes.

12. An apparatus for generating a set of restrictive costs associated with directional paths between selected nodes in a group of nodes of a network system wherein each of said nodes in said group is connected by a link to at least one other of said nodes in said group, and said link has a pair of directional costs associated therewith such that each of said links can be considered as a pair of oppositely-directed, unidirectional links each of which extends from a source node to a destination node and has a said directional cost associated therewith, said apparatus comprising memory for storing restrictive costs, and control logic configured to:

(a) assign a unique identifier to each of said selected nodes;

(b) select said unidirectional links in order of cost;

(c) for each of said unidirectional links selected, if a said identifier has previously been assigned to a said source node for a said link and said identifier has not previously been assigned to a said destination node for a said link, to assign said identifier to said destination node and any other of said nodes, which are reachable from said destination node by traversing said unidirectional links selected thus far, to which said identifier has not previously been assigned;

(d) if said step (c) results in assignment to a said selected node of a said identifier not previously assigned to said selected node, to store in said memory said directional cost of the last-selected of said unidirectional link as said restrictive cost for said directional path to said selected node from said selected nodes to which said identifier was initially assigned in said step (a); and (e) to repeat said steps (b) to (d) at least until said restrictive cost has been stored for said directional paths between said predetermined pairs of said selected nodes.

13. An apparatus according to claim 12 wherein, in said step (a), said unidirectional links are selected in order of increasing cost.

14. An apparatus according to claim 12 wherein, in said step (e), said predetermined pairs of said selected nodes are all pairs of said selected nodes.

15. An apparatus according to claim 12 wherein said control logic is configured such that, in said step (c), any said identifier previously assigned to said source node and not said destination node is assigned to said destination node and said further nodes.

16. An apparatus according to claim 12 wherein said control logic is configured such that, in said step (c), said identifier previously assigned to said source node is assigned to said destination node and said further nodes only if said identifier has not previously been assigned to said destination node, and then only to said destination node and said further nodes.

17. An apparatus according to claim 12 wherein the said control logic is further configured to generate a list of said unidirectional links sorted by order of cost, and wherein, in said step (b), said control logic selects successive entries from said list.

18. An apparatus according to claim 12 wherein said selected nodes are border nodes of said group, each of which is connected to another of said nodes of said network system outside said group.

19. An apparatus according to claim 18 wherein said group of nodes is a peer group of a PNNI hierarchical network.

20. A said network system including said apparatus according to claim 12.

21. A device for connection in a network system as one node in a group of nodes of said system such that each of said nodes in said group is connected by a link to at least one other of said nodes in said group, and a said link has a pair of directional costs associated therewith such that each of said links can be considered as a pair of oppositely-directed, unidirectional links each of which extends from a source node to a destination node and has a said directional cost associated therewith, said device comprising: control logic for generating a set of restrictive costs associated with directional paths between said selected nodes of said group; and memory for storing said restrictive costs; wherein said control logic is configured to generate said set of restrictive costs by:

(a) assigning a unique identifier to each of said selected nodes;

(b) selecting said unidirectional links in order of cost;

(c) for each of said unidirectional links selected, if a said identifier has previously been assigned to a said source node for a said link and said identifier has not previously been assigned to a said destination node for said link, assigning said identifier to said destination node and any further of said nodes, which are reachable from said destination node by traversing said unidirectional links selected thus far, to which said identifier has not previously been assigned;

(d) if said step (c) results in assignment to a said selected node of a said identifier not previously assigned to said selected node, storing said directional cost of the last-selected of said unidirectional links as said restrictive cost for said directional path to said selected node from a said selected node to which said identifier was initially assigned in said step (a); and (e) repeating said steps (b) to (d) at least until said restrictive cost has been stored for said directional paths between said predetermined pairs of said selected nodes.

22. A network system comprising a plurality of said nodes, at least one of said nodes comprising said device according to claim 21.

23. A computer program product, readable by a processor of a device for connection in a network system as one node in a group of nodes of said system such that each of said nodes in said group is connected by a link to at least one other of said nodes in said group, and a said link has a pair of directional costs associated therewith such that each of said links can be considered as a pair of oppositely-directed, unidirectional links each of which extends from a source node to a destination node and has a said directional cost associated therewith, said product comprising a computer program code means executable by said processor to generate a set of restrictive costs associated with directional paths between a selection of said nodes of said group by performing the steps of:

(a) assigning a unique identifier to each of said selected nodes;

(b) selecting said unidirectional links in order of costs;

(c) for a said unidirectional link selected, if a said identifier has previously been assigned to a said source node for said link and said identifier has not previously been assigned to said destination node for said link, assigning said identifier to said destination node and any further of said nodes, which are reachable from said destination node by traversing said unidirectional links selected thus far, to which said identifier has not previously been assigned;

(d) if said step (c) results in assignment to a said selected node of a said identifier not previously assigned to said selected node, storing said directional cost of the last-selected of said unidirectional links as said restrictive cost for said directional path to a said-selected node from a said-selected node to which said identifier was initially assigned in said step (a); and (e) repeating said steps (b) to (d) at least until said restrictive cost has been stored for said directional paths between said predetermined pairs of said selected nodes.

* * * * *